Feb. 16, 1960

R. L. HARVEY 2,925,388

FERROSPINEL COMPOSITIONS

Filed July 16, 1953

INVENTOR.
ROBERT L. HARVEY

BY
ATTORNEY

United States Patent Office 2,925,388
Patented Feb. 16, 1960

2,925,388

FERROSPINEL COMPOSITIONS

Robert L. Harvey, Princeton, N.J., assignor to Radio Corporation of America, a corporation of Delaware Application July 16, 1953, Serial No. 368,371

4 Claims. (Cl. 252—62.5)

This invention relates to improved ferrospinel compositions, also known as ferrites, and more particularly to ferrospinel compositions having improved magnetostrictive properties.

A description of many known compositions and of the theory of ferromagnetism of these compositions is given in an article in the RCA Review for September 1950, volume XI, Number 3, page 321, by R. L. Harvey et al., entitled "Ferromagnetic Spinels for Radio Frequencies."

Ferrospinel materials have also been utilized in magnetostrictive devices. This application has been described in an article by W. Van B. Roberts in the RCA Review for March 1953, volume XIV, Number 1, page 3, entitled "Some Applications of Permanently Magnetized Ferrite Magnetostrictive Resonators." One ferrospinel composition which has been used in magnetostrictive devices is a composition comprising approximately equal molecular proportions of NiO and $Fe_2O_3$, and sometimes also including relatively small quantities of ZnO. The magnetostrictive properties of the ternary system comprising NiO, ZnO, $Fe_2O_3$ are plotted in Figure 21 at page 362 of the article by R. L. Harvey et al. referred to heretofore.

An object of the present invention is to provide a ferrospinel composition having improved magnetostrictive properties.

Another object of the invention is to provide a ferrospinel composition having properties particularly suitable for utilization in magnetostrictive transducer devices.

These and other objects may be accomplished by the practice of the present invention a feature of which is the inclusion of a relatively small proportion of cobalt oxide in a nickel-zinc ferrospinel thus providing a novel composition having improved magnetostrictive properties.

The invention may be more easily understood by reference to the following detailed description and to the drawing of which:

According to a preferred embodiment of the invention, a mixture of metallic oxides in the molar proportions of 0.5 NiO and 0.5 $Fe_2O_3$ is intimately mixed together with a quantity of $Co_3O_4$ equal to about 0.8% by weight of the total of the nickel and iron oxides. The mixing may be accomplished by any convenient means such as a ball-mill. Care should be taken that the oxides are thoroughly mixed as is generally required in the production of other ferrospinel compositions.

The mixed oxides are sintered in an air atmosphere at about 1150° C. for about one hour and permitted to cool to room temperature.

The sintered oxides are removed from the furnace and again ground, as in a ball-mill, to obtain a relatively small particle size such as a few microns. An organic binder such as paraffin and a lubricant such as zinc stearate are added to the sintered oxides and mixed to form a putty-like mass. This mass is preferably dried and formed into pellets of a size convenient for molding.

The pellets may be molded by compression, extrusion or any other known method to form a shaped body which is fired at about 1400° C. for about one hour in an air atmosphere and allowed to cool to room temperature in the furnace. The average rate of cooling is preferably about 75° to 100° C. per hour and is somewhat critical for optimum results.

Figure 3:
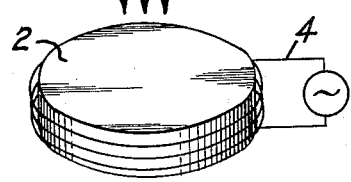
Figure 3 is a perspective view of a magnetostrictive element according to the instant invention.

A shaped body thus formed may be advantageously utilized as a magnetostrictive element as shown in Figure 3 wherein the body 2 is placed within an input coil 4 and subjected to a magnetic biasing field indicated by the arrows 6.

A shaped body according to the invention exhibits a coefficient of electromechanical coupling about 50% greater than a shaped body formed in exactly similar manner but without the inclusion of $Co_3O_4$ in its composition. A body formed in accordance with the present invention also exhibits a magnetostrictive property, $\lambda$, about 50% greater than a similar body made without cobalt. This property will be explained hereinafter.

The method of manufacture of magnetostrictive bodies according to the invention is not generally critical. An essential feature of the invention lies in the addition of from 0.1% to 1.5% $Co_3O_4$, or a cobalt oxide-yielding material such as $CoCO_3$ in an equivalent amount, to a magnetostrictive composition of metallic oxides.

It is not definitely known in what form the cobalt oxide is present in the final product. It is believed, however, that the principal advantages of the instant invention are due to the inclusion of cobalt in the crystal lattice. The amount of oxygen associated with each cobalt atom or ion in the ferrospinel is, of course, indeterminate, since it is not known how much oxygen is taken on or given off by the composition during firing and cooling. Neither is it known whether the cobalt ions occupy regular lattice sites or are disposed interstitially in the lattice. The amount of cobalt, however, in the completed fired body is definite and corresponds to about 73.4% by wgt. of the amount of $Co_3O_4$ initially added to the composition. Thus, a fired body produced according to the invention includes from .073% to 1.1% by wgt. cobalt, the preferred amount being about 0.6%.

For purposes of the present discussion it is assumed that cobalt is present in the fired ferrospinel in the form of $Co_3O_4$ since this compound is commonly available and readily mixed with other oxides in the process.

Figure 1:
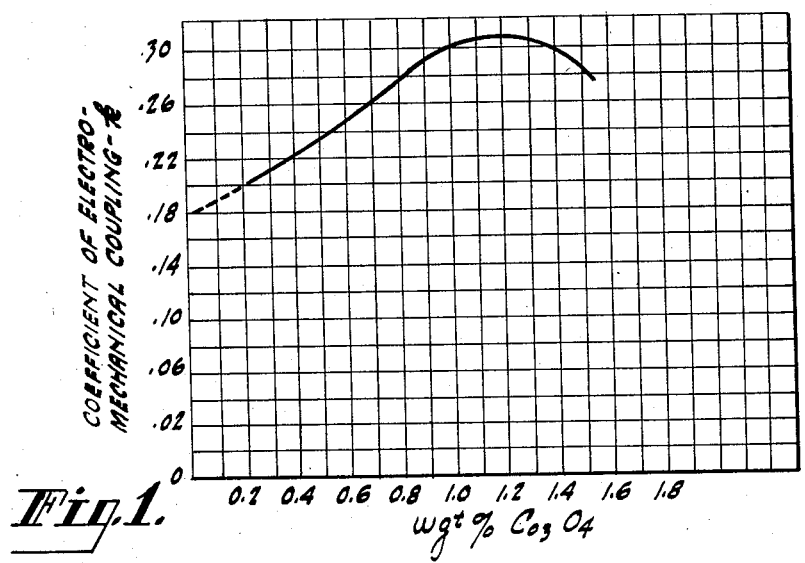
Figure 1 is a curve showing the variation of the coefficient of electro-mechanical coupling of a nickel ferrospinel as a function of the proportion of cobalt oxide present in the composition.

Figure 1 shows a curve illustrating the new and unexpected increase in the coefficient of electromechanical coupling of a nickel ferrospinel including $Co_3O_4$. As shown by the curve, a body of nickel ferrospinel containing essentially no $Co_3O_4$ exhibits a coefficient of about 0.18. As increasingly larger quantities of $Co_3O_4$ are included in the composition the coefficient of electromechanical coupling increases up to a maximum value of about 0.31. This value is obtained when the composition comprises about 1.1 wgt. percent $Co_3O_4$. Further increases of $Co_3O_4$ result in a coefficient which is not as large as the maximum.

Figure 2:
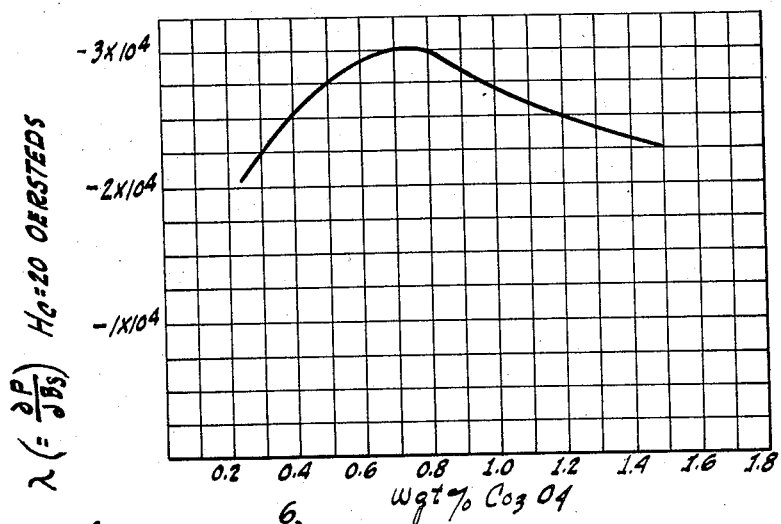
Figure 2 is a curve showing the variation of another magnetostrictive property, hereinafter explained, of a nickel ferrospinel as a function of the proportion of cobalt oxide present in the composition.

The magnetostrictive property $\lambda$ is defined as $$\lambda = \frac{\partial P}{\partial B_s}$$

where $B_s$ is induction in a body and $P$ is the pressure exerted by the body. It may be considered a measure of the magnetostrictive force exerted by a body held in a rigidly restrained condition and magnetostrictively excited. This property also is advantageously increased by the inclusion of $Co_3O_4$ in a nickel ferrospinel. As shown in Figure 2, a maximum value of $\lambda$ is obtained in the nickel ferrospinel described in the preceding paragraph when about 0.7 wgt. percent of $Co_3O_4$ is included in its composition.

In many magnetostrictive devices it is desirable to provide a body having both a maximum of electromechanical coupling and a maximum value of $\lambda$. Since in this composition these two maxima require the addition of different amounts of $Co_3O_4$, a preferred composition represents a compromise and comprises about 0.8 wgt. percent $Co_3O_4$. This composition is preferred for those applications where it is desired to provide a material having both properties as large as possible.

The method steps of mixing, grinding and heating described in connection with the preferred embodiment are not critical in the practice of the invention. These steps may be as in the production of any other ferrospinel. For example, it is not necessary to sinter the oxides before molding them into a compressed body, and the final heating of the compressed body may be carried out at any convenient temperature between about 950° C. and 1500° C. for a few minutes up to several hours. Similarly the rate of cooling may be varied. The cobalt oxide may be added, alternatively, in any of many forms, such as cobalt carbonate, that are capable of yielding cobalt oxide when heated to the recommended temperatures. It may be added to the composition subsequently to the sintering of the other oxides instead of before the sintering.

The improvements provided by the practice of the instant invention are not critically dependent upon the process steps described in the preceding paragraph; however, optimum results are so dependent. For example, the procedure described in connection with the preferred embodiment is believed to produce a ferrospinel composition having optimum magnetostrictive properties. Although similar compositions produced by other procedures show less desirable magnetostrictive properties, they are improved by the addition of cobalt oxide.

Generally any method useful in the production of other ferrospinel bodies may be employed to produce magnetostrictive ferrospinel bodies according to the invention. Optimum results, however, are obtained according to the method described in connection with the preferred embodiment.

Other compositions in the nickel-zinc ferrospinel system also show improved magnetostrictive properties when prepared with cobalt oxide. For example, the table shows test results of three different compositions, each both with and without cobalt oxide. It should be noted that the quality factor $k'$ shown in the table is a different factor from the $k$ shown in Figure 1, and the values shown in the table are not comparable with the values shown in the figure. The $k'$ shown in the table is a relative measure of the coefficient of magnetrostrictive coupling and is useful to determine relative relationships only.

Table

| Composition | | | | $k'$ | Percent Increase of $k'$ due to added Cobalt Oxide |
|---|---|---|---|---|---|
| Molar, Percent | | | Percent Cobalt Oxide (as $Co_3O_4$) by wgt. based on total | | |
| $Fe_2O_3$ | NiO | ZnO | | | |
| 50 | 30 | 20 | --------- | 5.9 | --------- |
| 50 | 30 | 20 | 0.78 | 8.5 | 44 |
| 55 | 45 | ----- | --------- | 5.7 | --------- |
| 55 | 45 | ----- | 0.78 | 7.6 | 33 |
| 40 | 60 | ----- | --------- | 4.0 | --------- |
| 40 | 60 | ----- | 0.78 | 5.4 | 35 |

Tests made to determine the quantities of $k'$ shown in the table comprised an energy absorption method. The test samples, cuboidal in shape, were placed successively within a coil excited by an alternating electric current of controllable frequency. The impressed frequency and the resonance of the coil, with the sample within it, were adjusted to coincide with the mechanical resonant frequency of the sample. At this frequency the sample absorbs energy from the coil. The amount of absorbed energy is proportional to the magnetostrictive coupling of the sample. The relative amount of the absorbed energy and the relative scope of the frequency range within which energy is absorbed determine the value of $k'$.

The values of $k$ and $\lambda$ shown in Figures 1 and 2 are true measures of these properties. To plot these curves samples were tested and measured according to a technique described in Summary Technical Report NDRC, Div. 6, vol. 13, chapters 3 and 4, Washington, D.C., 1946. In determining $\lambda$, samples were tested in a magnetic field of about 20 Oersteds.

There have thus been described improved ferrospinel compositions including cobalt oxide that have particularly advantageous magnetostrictive properties and are especially suitable for use in transducer devices.

What is claimed is:
1. A composition of matter having a coefficient of electromechanical coupling between above 0.18 and about 0.30 consisting essentially of nickel ferrospinel including 0.1 to 1.5 wgt. percent cobalt oxide.
2. A ferrospinel composition having a coefficient of electromechanical coupling between above 0.18 and about 0.30 consisting essentially of stoichiometric proportions of NiO and $Fe_2O_3$ and a quantity of cobalt oxide equal to about 0.1 to 1.5 wgt. percent of the total.
3. A ferrospinel composition according to claim 3 in which said quantity of cobalt oxide is equal to about 0.8 wgt. percent of the total.
4. A composition of matter having a coefficient of electromechanical coupling between above 0.18 and about 0.30 consisting essentially of nickel ferrospinel including .07 to 1.1 wgt. percent cobalt, as cobalt oxide.

References Cited in the file of this patent

UNITED STATES PATENTS

| | | |
|---|---|---|
| 2,575,099 | Crowley | Nov. 13, 1951 |
| 2,656,319 | Berge | Oct. 20, 1953 |
| 2,659,698 | Berge | Nov. 17, 1953 |
| 2,723,239 | Harvey | Nov. 8, 1955 |
| 2,734,034 | Crowley | Feb. 7, 1956 |
| 2,736,708 | Crowley et al. | Feb. 28, 1956 |
| 2,751,354 | Brockman | June 19, 1956 |